Sept. 28, 1937. P. N. MILLER 2,094,077
MOTOR VEHICLE
Filed Nov. 19, 1934
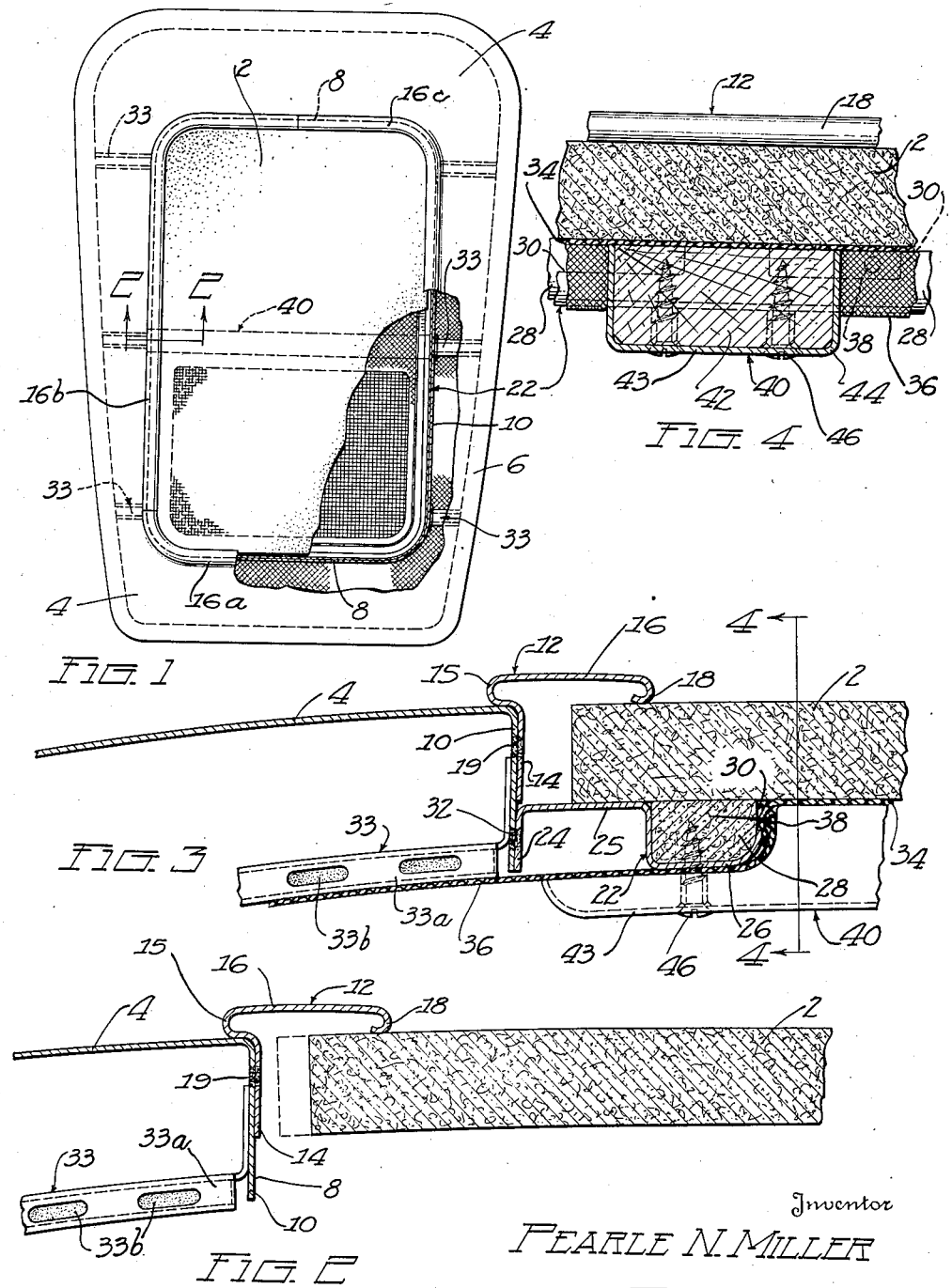

Patented Sept. 28, 1937

2,094,077

UNITED STATES PATENT OFFICE 2,094,077

MOTOR VEHICLE

Pearle N. Miller, Detroit, Mich., assignor to Packard Motor Car Company, Detroit, Mich., a corporation of Michigan Application November 19, 1934, Serial No. 753,610

1 Claim. (Cl. 296—137)

This invention relates to motor vehicles and particularly to roof constructions for the bodies of motor vehicles of the closed type.

One object of the invention is to produce a novel and improved roof construction for the bodies of motor vehicles of the above type.

Another object of the invention is to produce, for vehicles of said type, an improved construction for securing the central panel or deck of the roof to the border panel.

Another object of the invention is to provide, in a motor vehicle roof construction in which the central panel of the roof consists of a stiff sheet of material secured at its margin to the border panel, a novel and improved construction for securing the margin of said sheet to the border panel.

In the manufacture of the roof portions of the bodies of motor vehicles substantial variations occur in the length and width of the opening in the border panel. Another object of the invention is to produce a roof construction in which a sheet of stiff material cut to a predetermined shape and size is employed as the central panel of the roof and is secured to the border panel by a novel and improved construction which is arranged to accommodate the variations in the length and width of the opening in the border panel and to maintain a tight water proof joint between the border panel and the central panel.

With the above and other objects in view the invention consists in a roof construction for motor vehicles embodying the novel and improved features hereinafter described and particularly pointed out in the claims, the advantages of which will be readily understood by those skilled in the art.

The invention will be clearly understood from the accompanying drawing illustrating the invention in its preferred form and the following detailed description of the construction therein shown.

In the drawing, Fig. 1 is a plan view partly broken away illustrating a motor vehicle roof construction embodying the invention;

Fig. 2 is a detail sectional view of a partially completed roof taken substantially on the line 2—2 of Fig. 1;

Fig. 3 is a view similar to Fig. 2 illustrating the roof in completed condition, and Fig. 4 is a detail sectional view taken substantially on the line 4—4 of Fig. 3.

In the form of the invention illustrated in this application, the invention is embodied in a roof construction comprising a central panel indicated at 2, a border panel indicated at 4 and a roof rail indicated at 6. The border panel consists of the usual sheet metal construction having an opening 8 within which the central panel is secured.

The border panel 4 is provided, at the inner margin thereof extending along the opening 8, with a downturned flange 10. Within the inner margin of the border panel is secured a strip 12 made of sheet metal and having substantially the cross section shown in Figs. 2 and 3. The strip 12 is constructed to fit within the inner margin of the border panel and is secured to said panel in the position clearly shown in these figures. As shown in these figures, the strip is provided with a downwardly extending flange 14 fitting within and secured to the downwardly extending flange 10 on the border panel. The strip is further provided with a reversely bent portion 15 which overlaps the upper face of the border panel and with a flange 16 extending inwardly with relation to the opening 8 substantially perpendicular to the flange 14 and terminating in a turned back margin 18 arranged to engage the outer face of the panel 2 at its margin. The strip is secured to the border panel preferably by means of a series of spot welds 19 attaching the flange 14 on the strip to the flange 10 on the border panel.

The strip 12 is preferably applied to the border panel in three sections indicated respectively at 16a, 16b and 16c in Fig. 1, each section having one or more angular bends to adapt the same to extend about the rounded corners of the opening 8 and having sufficient stock to overlap the adjacent sections. At each point at which two sections meet the end of one section or the ends of both sections are cut off so that an exact abutting fit at the adjacent ends of the sections is secured and the ends of said sections preferably are welded together.

The central panel 2 for closing the opening 8 in the border panel preferably consists of a stiff, thick sheet of fabricated material cut to a predetermined length, width and shape and provided on one side thereof with a smooth surface suitable to receive a finishing coating to cause the same to present an appearance similar to that of the adjacent outer surface of the border panel. The stiffness of the material of the sheet is preferably such that it is self-supporting when applied to the inner margin of the border panel thereby enabling the usual cross braces or ribs to be eliminated although one or more of such ribs may be employed if desired. The sheet or panel 2 is preferably shaped in the process of manufacture so that it is slightly bowed in cross section longitudinally and transversely and is applied to the border panel with the slightly convex side uppermost. The bowed cross section of the panel will give the same a greater resistance against sagging. The panel may consist of any one of various materials suitable to secure the above results. The panel may consist of a sheet of fibre impregnated with a suitable binder and having one or both surfaces thereof coated with water proof material.

The central panel 2 is applied to the border panel after the strip 12 is secured to the latter panel. In applying the sheet 2 to the border panel, the said sheet is positioned within the strip 12 below the flange 16 and preferably with the smooth coated surface of the sheet on the upper side thereof and the margin of the sheet is engaged with the turned back portion 18 of said flange. The margin of the sheet 2 may overlap the flange 16 different distances as indicated respectively in full lines and in dotted lines in Fig. 2. This provision for variations in the overlapping relation of the sheet to the flange will accommodate substantial variations in the length and width of the opening 8 occurring in the manufacture of the border panel.

In order to hold the margin of the sheet 2 in engagement with the margin of the flange 16 so as to form a tight water proof joint, a strip 22 made of sheet metal and having the cross section shown in Fig. 3 is secured to the border panel in engagement with the margin of said sheet on the under side thereof as clearly shown in said figures. The strip 22 is arranged to fit within the flange 10 on the border panel and is secured to said flange in the position shown in Fig. 3. The strip is provided with a downwardly extending flange 24 arranged to fit within and secured to the flange 10 on the border panel and with a body 25 forming a flange extending inwardly from the flange 24 for engagement with the margin of the sheet 2 on the under side thereof. The body of the strip 22 is provided with a trough shaped portion 26 to receive a filler 28 of hard paper or similar material into which tacks or other fastening devices may be driven to secure the headlining to the roof and with slots 30 for the passage of said fastening devices.

When the sheet 2 has been applied to the strip 12 with the margin of the sheet engaged with the inner margin of the flange 16 on the under side thereof, the strip 22 is inserted within the flange 10 with the body 25 of the strip engaged with the margin of the sheet on the under side of said margin and the strip 22 is forced upwardly against said sheet with considerable pressure which presses the sheet forcibly against the margin of the flange 16. The strip 22 is then secured in position preferably by means of a series of spot welds 32 attaching the flange 24 to the flange 10. The strip 22 may also be secured to the flange 10 in sections.

When the strip 22 is forced upwardly against the margin of the sheet 2, the flange 16 yields to some degree and the margin of the sheet 2, which is preferably made of compressible, resilient material, is slightly compressed by this pressure. The resilience of the flange 16 will cause the same to exert constantly a yielding pressure downwardly against the margin of the sheet 2 so as to maintain a tight water proof joint between the same and the sheet. The resilience of the sheet itself which tends to expand against said pressure also tends to keep the joint tight.

A series of tacking strips 33 are each secured at one end to the flange 10 on the border panel and extend outwardly from said flange as shown in Figures 2 and 3 for the attachment of the headlining. These strips preferably consist of an outer casing 33a of sheet metal and a filler 33b of material for receiving tacks or other fastening devices for securing the headlining in place.

After the margin of the sheet 2 has been secured between the flange 16 of the strip 12 and the body 25 of the strip 22, the headlining is attached to the roof. As shown in the drawing the headlining consists of two sections indicated respectively at 34 and 36. The section 34 is secured to the lower surface of the sheet 2 preferably by an adhesive and its margin is turned downwardly over the inner portion of the strip 22. The margins of the sections 34 and 36 are overlapped and are secured to the strip 22 by means of a series of tacks or other fastening devices 38 passing through the margins of said sections and through the slots 30 and driven into the filler 28. In order to conceal the fastening devices the margin of the section 36 is superposed upon the margin of the section 34 and the body of the section 36 is turned outwardly over the heads of the fastening devices in the manner shown in Fig. 3. The section 36 of the headlining is secured to the tacking strips 33 by means of tacks or other fastening devices driven through strips of fabric (not shown) attached to the inner face of the headlining and into said tacking strips.

In the present construction, the central portion of the panel 2 is supported by a transverse bow 40. This bow preferably consists of a body 42 of wood, covered by a sheathing 43 of sheet metal. The ends of the bow are each provided with a recessed portion shaped to receive the strip 22 and the bow is secured to said strip on opposite sides of the opening 8 by means of screws 46 passing through openings in the end portions of the bow and threaded into the sheet metal of strip 22 and into the filler 28.

In the above construction with a central panel cut to a predetermined length and width, the width of the flange 16 on the strip 12 and that of the opposed body of the strip 22 will compensate for and accommodate considerable variations in the length and width of the opening 8. The pressure of the flanges 16 and 25 on the margin of the central panel will maintain a tight water proof joint between the flange 16 and said panel. The outer smooth coated surface of the central panel may be given a finish to resemble the finish of the outer surface of the border panel thereby giving the roof a uniform attractive appearance. The central panel may be readily secured in position within the opening 8 without the use of nails, screws or other fastening devices to form a strong durable roof construction.

It is to be understood that the invention is not limited to a construction in which the opening in the border panel is closed by a central panel of stiff sheet material but that certain features thereof may be applied to other constructions. It is also to be understood that the invention is not limited to the particular construction and arrangement of parts of the illustrated embodiment of the invention but that the invention may be embodied in other forms within the scope of the claims.

What is claimed is:

In a vehicle body, a roof structure comprising a metal border panel having a downturned flange defining a roof opening, a preformed metal top strip having a downwardly extending flange permanently fixed against the inner face of said border panel flange and a flange extending inwardly around the boundary of the opening and terminating in a turned down marginal portion, a central roof panel in the opening defined by the downturned border panel flange and having its top surface bearing against the downturned marginal portion of said strip, and a preformed metal bottom strip having a flange permanently fixed against the inner face of the downturned border panel flange and a flange extending inwardly under the marginal portion of the central roof panel, said bottom strip being so located and fixed to such portion of the inner face of said border panel flange that the inwardly extending flange of the bottom strip exerts upward pressure against the central panel and presses the central panel upwardly in leak-proof relation against the downturned marginal portion of the top strip.

PEARLE N. MILLER.